US011422714B1

(12) United States Patent
Golden et al.

(10) Patent No.: US 11,422,714 B1
(45) Date of Patent: *Aug. 23, 2022

(54) EFFICIENT COPYING OF DATA IN A STORAGE SYSTEM

(71) Applicant: PURE STORAGE, INC., Mountain View, CA (US)

(72) Inventors: Christopher Golden, Emerald Hills, CA (US); Scott Smith, San Mateo, CA (US); Luke Paulsen, Mountain View, CA (US); David Grunwald, San Francisco, CA (US); Jianting Cao, Sunnyvale, CA (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,938

(22) Filed: Jan. 28, 2021

Related U.S. Application Data

(63) Continuation of application No. 16/294,019, filed on Mar. 6, 2019, now Pat. No. 10,956,054, which is a continuation of application No. 15/499,068, filed on Apr. 27, 2017, now Pat. No. 10,268,403, which is a continuation of application No. 14/926,162, filed on Oct. 29, 2015, now Pat. No. 9,740,414.

(51) Int. Cl.
*G06F 12/00* (2006.01)
*G06F 3/06* (2006.01)

(52) U.S. Cl.
CPC ............ *G06F 3/0619* (2013.01); *G06F 3/065* (2013.01); *G06F 3/0665* (2013.01); *G06F 3/0689* (2013.01)

(58) Field of Classification Search
CPC ............ G06F 12/1009; G06F 12/1027; G06F 2212/657; G06F 2212/68
See application file for complete search history.

(56) References Cited

U.S. PATENT DOCUMENTS

| 5,706,210 | A | 1/1998 | Kumano et al. |
| 5,799,200 | A | 8/1998 | Brant et al. |
| 5,933,598 | A | 8/1999 | Scales et al. |

(Continued)

FOREIGN PATENT DOCUMENTS

| EP | 0725324 A2 | 8/1996 |
| WO | 2012087648 A2 | 6/2012 |

(Continued)

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

(Continued)

*Primary Examiner* — Yong J Choe (57) ABSTRACT

Optimizing copy operations in a storage array, including: receiving a plurality of copy operations; detecting a triggering event that causes a storage array controller to initiate execution of the plurality of copy operations; and combining, in dependence upon a metadata optimization policy, the plurality of copy operations into a single copy operation.

19 Claims, 5 Drawing Sheets

(56) References Cited

U.S. PATENT DOCUMENTS

| | | |
|---|---|---|
| 6,012,032 A | 1/2000 | Donovan et al. |
| 6,085,333 A | 7/2000 | Dekoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,909 B2 | 9/2015 | Padia et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 9,740,414 B2 | 8/2017 | Cao et al. |
| 10,268,403 B1 | 4/2019 | Cao et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0359203 A1* | 12/2014 | Tipton ............... G06F 12/0866 711/103 |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |

(56) References Cited

U.S. PATENT DOCUMENTS

| | | | |
|---|---|---|---|
| 2015/0324135 A1* | 11/2015 | Chan | G06F 3/0629 |
| | | | 711/114 |
| 2015/0378888 A1 | 12/2015 | Zhang et al. | |
| 2016/0098323 A1 | 4/2016 | Mutha et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2017/0123691 A1 | 5/2017 | Cao et al. | |
| 2018/0081562 A1 | 3/2018 | Vasudevan | |

FOREIGN PATENT DOCUMENTS

| | | |
|---|---|---|
| WO | 2013071087 A1 | 5/2013 |
| WO | 2014110137 A1 | 7/2014 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |

OTHER PUBLICATIONS

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dietzip file format", GitHub.com (online), accessed Jul. 28, 2015,1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 12 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

Kong, "Using PCI Express as The Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrd_Identity_Datasheet.pdf.

Microsoft, "Hybrid Identity", Microsoft (online), Apr. 2014, 36 pages, URL: www.aka.ms/HybridIdentityWp.

Pcmag, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive.org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

* cited by examiner

EFFICIENT COPYING OF DATA IN A STORAGE SYSTEM

CROSS-REFERENCE TO RELATED APPLICATIONS

This application is a continuation application of and claims priority from U.S. patent application Ser. No. 16/294,019, filed Mar. 6, 2019, which is a continuation application of and claims priority from U.S. Pat. No. 10,268,403, issued Apr. 23, 2019, which is a continuation application of and claims priority from U.S. Pat. No. 9,740,414, issued Aug. 22, 2017.

BACKGROUND

Field of Technology

The field of technology is data processing, or, more specifically, methods, apparatuses, and products for optimizing copy operations.

Description of Related Art

Modern computing systems frequently include a wide array of computer hardware resources and computer software applications executing on or otherwise utilizing the computer hardware resources. Such applications may perform data transfer operations that result in data being copied from a first memory location to a second memory location, for example, as part of a memory backup operation. Frequently, the applications may limit the amount of data that may be copied from a first memory location to a second memory location. As such, copying an amount of data that exceeds such a limit may be carried out using multiple operations, each of which is associated with a significant overhead. For example, each operation may require the creation of a significant amount of metadata.

SUMMARY

Methods, apparatus, and products for optimizing copy operations, including: receiving a plurality of copy operations; detecting a triggering event that causes the storage array controller to initiate execution of the plurality of copy operations; combining, in dependence upon a metadata optimization policy, the plurality of copy operations into a single copy operation; and initiating execution of the single copy operation.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
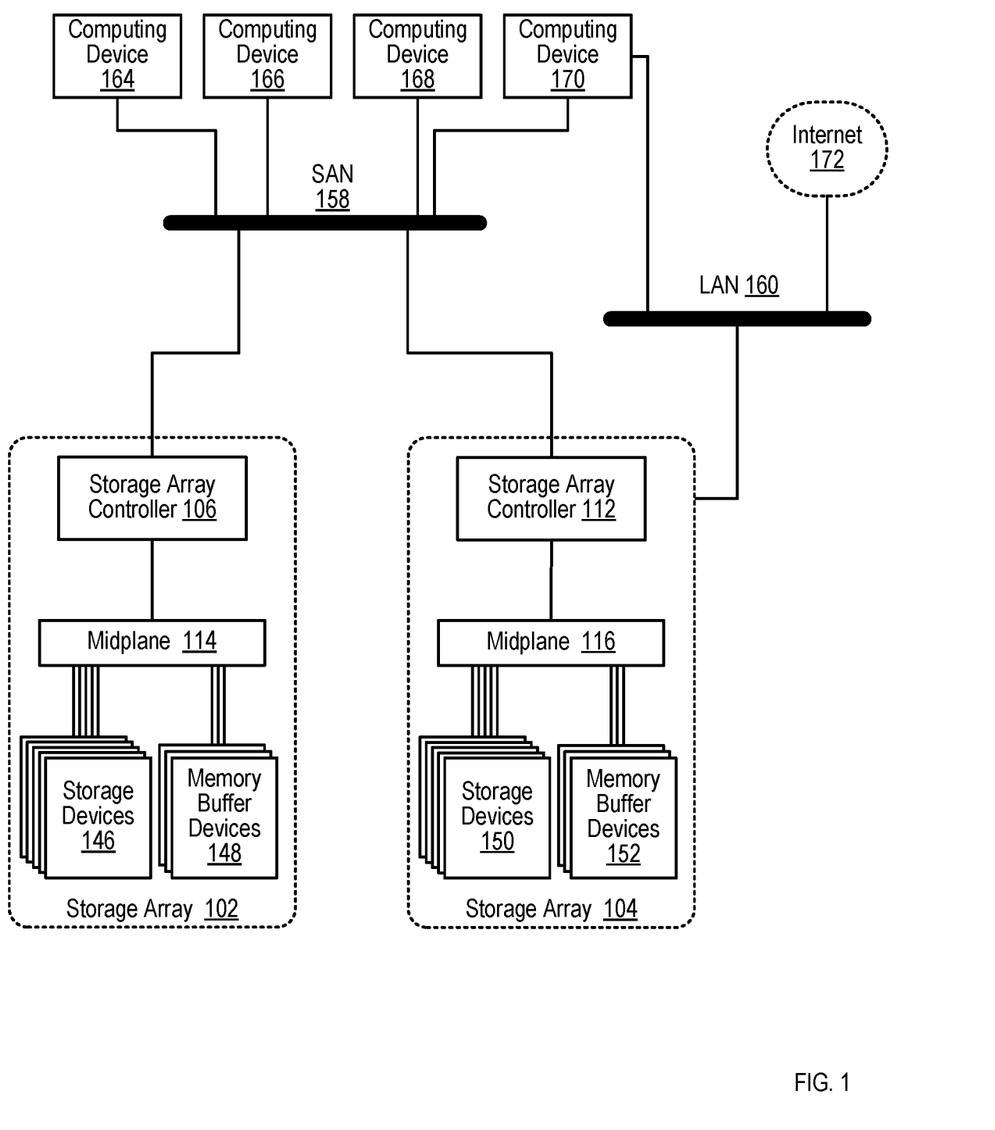
FIG. 1 sets forth a block diagram of an example system configured for optimizing copy operations according to embodiments of the present disclosure.

Example methods, apparatuses, and products for optimizing copy operations in accordance with the present disclosure are described with reference to the accompanying drawings, beginning with FIG. 1. FIG. 1 sets forth a block diagram of a system configured for optimizing copy operations according to embodiments of the present disclosure. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IF'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170)

to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be useful in optimizing copy operations according to embodiments of the present disclosure. The storage array controllers (106, 112) may assist in optimizing copy operations by receiving a plurality of copy operations, detecting a triggering event that causes the storage array controller to initiate execution of the plurality of copy operations, combining the plurality of copy operations into a single copy operation, initiating execution of the single copy operation, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Optimizing copy operations in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in optimizing copy operations according to embodiments of the present disclosure.

Figure 2:
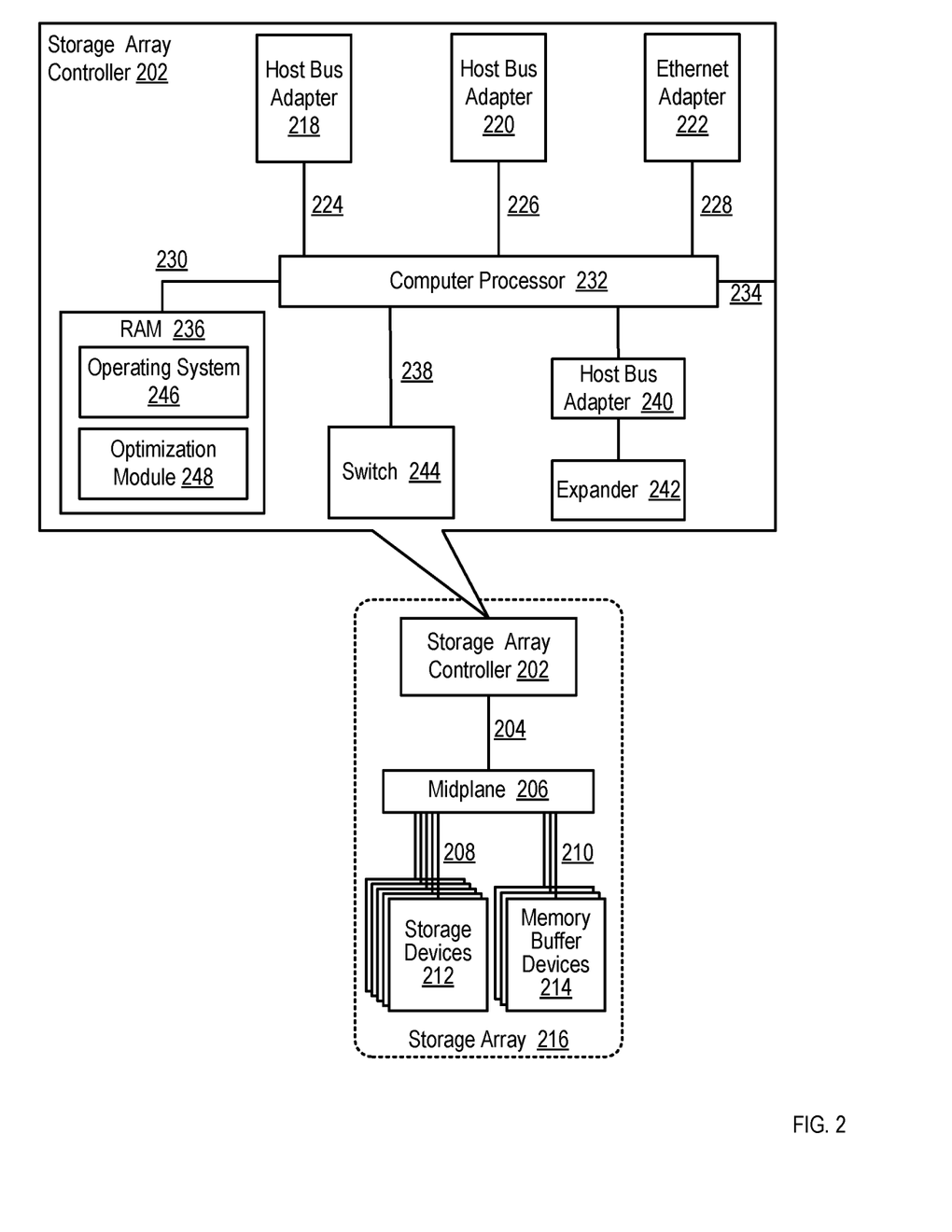
FIG. 2 sets forth a block diagram of an example storage array controller useful in optimizing copy operations according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for optimizing copy operations according to embodiments of the present disclosure include UNIX™, Linux™, Microsoft Windows™, and others as will occur to those of skill in the art. Also stored in RAM (236) is an optimization module (248), a module that includes computer program instructions useful in optimizing copy operations according to embodiments of the present disclosure.

The optimization module (248) of FIG. 2 may be configured to optimize copy operations by receiving a plurality of copy operations. The copy operations may be included in a stream of virtual copy operations. Such virtual copy operations may be embodied, for example, as operations configured to copy virtualized storage (e.g., virtual disks, virtual volumes) from one location to another location within a storage array or even between multiple storage arrays. Such virtual copy operations may be received as a stream where new, incoming virtual copy operations are received at regular intervals, irregular intervals, or any combination thereof. The plurality of copy operations may be embodied, for example, as a plurality of extended copy ('XCOPY') operations, as a plurality of offloaded data transfers ('ODX') operations, as a combination of different types of operations, and so on.

The optimization module (248) of FIG. 2 may be further configured to optimize copy operations by detecting a triggering event that causes the storage array controller (202) to initiate execution of the plurality of copy operations. A triggering event can represent an event whose occurrence causes the storage array controller (202) to initiate the execution of one or more of the copy operations received by the storage array controller (202). Such triggering events may include, for example, the number of copy operations that have been received but not processed exceeding a predetermined threshold, the amount of time since a copy operation has been received but not processed exceeding a predetermined threshold, the amount of time since one or more of the copy operations have been received but not processed exceeding a predetermined threshold, the storage array controller (202) receiving a request to write data to a storage location that is identified in one or more of the copy operations as being an area of storage that is to be copied, and so on.

The optimization module (248) of FIG. 2 may be further configured to optimize copy operations by combining the plurality of copy operations into a single copy operation. Combining the plurality of copy operations into a single copy operation may be carried out, for example, by creating a new copy operation whose parameters capture all storage locations that were identified for copying in the plurality of copy operations. Consider an example in which a first copy operation included a request to copy the first 16 GB of the address space in a particular storage device, a second copy operation included a request to copy the second 16 GB of the address space in the same storage device, and a third copy operation included a request to copy the third 16 GB of the address space in the same storage device. In such an example, combining the plurality of copy operations into the single copy operation may be carried out by creating a new copy operation and specifying the first 48 GB of the address space in the storage device as the area of storage that is to be copied.

The optimization module (248) of FIG. 2 may be further configured to optimize copy operations by initiating execution of the single copy operation. The storage array controller (202) of FIG. 2 may initiate execution of the single copy operation, for example, by sending the single copy operation to a particular storage device from which data is to be copied.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
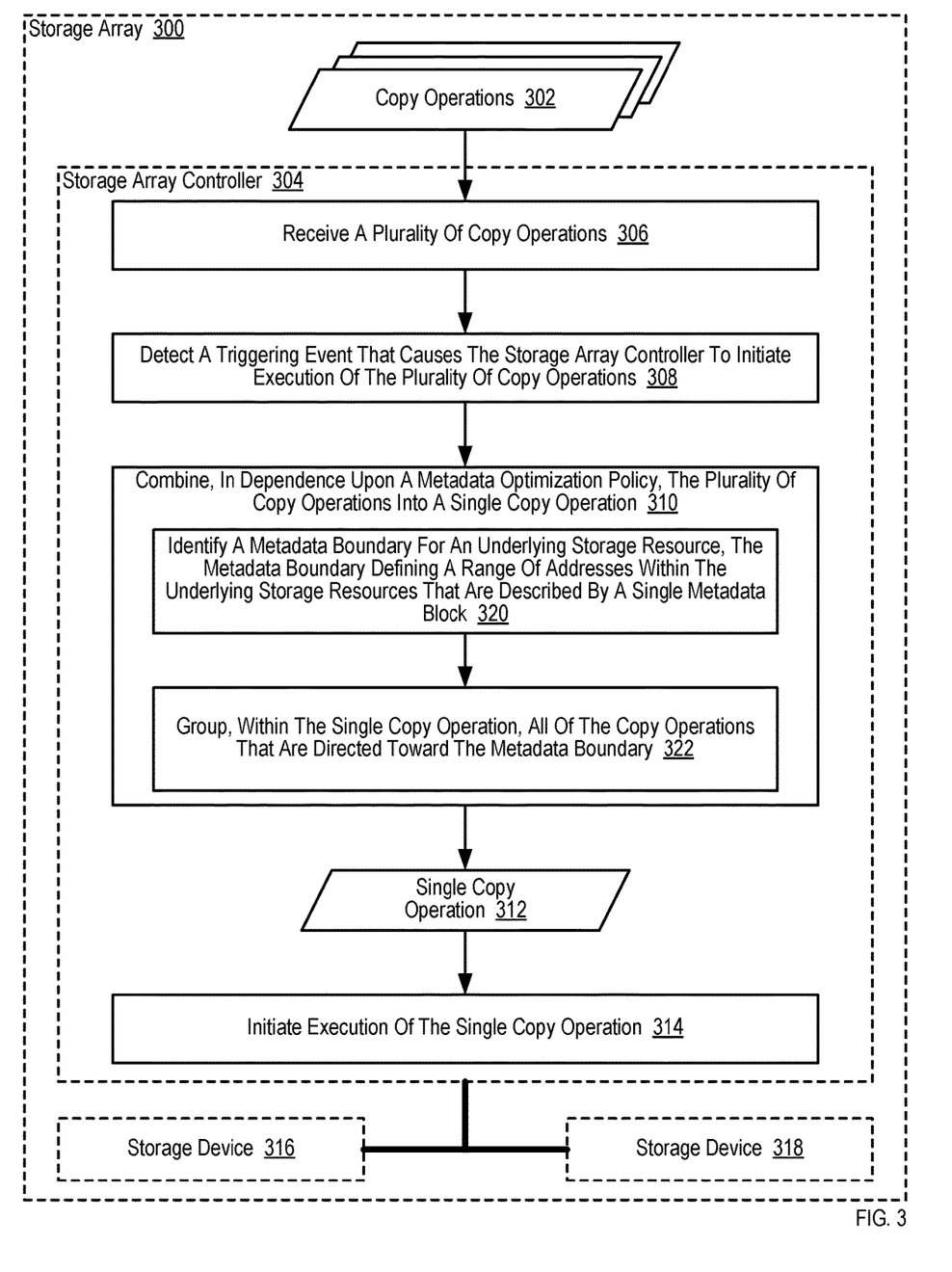
FIG. 3 sets forth a flow chart illustrating an example method for optimizing copy operations according to embodiments of the present disclosure.

For further explanation, FIG. 3 sets forth a flow chart illustrating an example method for optimizing copy operations according to embodiments of the present disclosure. The example method depicted in FIG. 3 includes a storage array (300). The storage array (300) depicted in FIG. 3 can include a plurality of storage devices and a storage array controller (304) that is coupled for data communications to the storage devices (316, 318). Although not depicted in similar detail, readers will appreciate that the storage array (300) depicted in FIG. 3 may be similar to the storage arrays described above with reference to FIG. 1. The example method depicted in FIG. 3 may be carried out, at least in part, by a storage array controller (304) that is similar to the storage array controllers described above with reference to FIG. 1 and FIG. 2.

The example method depicted in FIG. 3 includes receiving (306) a plurality of copy operations (302). The copy operations (302) depicted in FIG. 3 may be included in a stream of virtual copy operations. Such virtual copy operations may be embodied, for example, as operations configured to copy virtualized storage (e.g., virtual disks, virtual volumes) from one location to another location within a storage array or even between multiple storage arrays. Such virtual copy operations may be received as a stream where new, incoming virtual copy operations are received at regular intervals, irregular intervals, or any combination thereof. The plurality of copy operations (302) may be embodied, for example, as a plurality of XCOPY operations, as a plurality of ODX operations, as a combination of different types of operations, and so on.

The example method depicted in FIG. 3 also includes detecting (308) a triggering event that causes the storage array controller (304) to initiate execution of the plurality of copy operations. A triggering event can represent an event whose occurrence causes the storage array controller (304) to initiate the execution of one or more of the copy operations (302) received by the storage array controller (304). Such triggering events may include, for example, the number of copy operations (302) that have been received (306) but not processed exceeding a predetermined threshold, the amount of time since a copy operation (302) has been received (306) but not processed exceeding a predetermined threshold, the amount of time since one or more of the copy operations (302) have been received (306) but not processed exceeding a predetermined threshold, the storage array controller (304) receiving a request to write data to a storage location that is identified in one or more of the copy operations (302) as being an area of storage that is to be copied, and so on.

The example method depicted in FIG. 3 also includes combining (310) the plurality of copy operations (302) into a single copy operation (312). Combining (310) the plurality of copy operations (302) into a single copy operation (312)

may be carried out, for example, by creating a new copy operation having parameters that capture all storage locations that were identified for copying in the plurality of copy operations (302). Consider an example in which a first copy operation included a request to copy the first 16 GB of the address space in a particular storage device, a second copy operation included a request to copy the second 16 GB of the address space in the same storage device, and a third copy operation included a request to copy the third 16 GB of the address space in the same storage device. In such an example, combining (310) the plurality of copy operations (302) into the single copy operation (312) may be carried out by creating a new copy operation and specifying the first 48 GB of the address space in the storage device as the area of storage that is to be copied.

In the example method depicted in FIG. 3, the plurality of copy operations (302) are combined (310) into a single copy operation in dependence upon a metadata optimization policy. The metadata optimization policy may be embodied as one or more rules utilized to determine, for example, which copy operations (302) are combined (310) into a single copy operation (312), the order in which the copy operations (302) are to be combined (310) into the single copy operation (312), and so on. Such a metadata optimization policy may be structured in such a way that copy operations are selected for inclusion within the single copy operation (312) and ordered in such a way within the single copy operation (312) that causes, for example, the least amount of metadata to be stored in the storage array (300), the least amount of metadata to be read or written during the execution of the single copy operation (312), and so on.

Consider an example in which each of the storage devices (316, 318) depicted in FIG. 3 are logically broken up into 1 MB chucks. Further assume that each 1 MB chunk is described by metadata that maps, for example, a logical address for some data stored within the 1 MB chuck to a physical address of the data. In such an example, assume that a plurality of copy operations (302) are issued to copy data stored on the first storage device (316) to the second storage device (318). If the copy operations are combined such that executing the resultant single copy operation (312) would cause data to be read from a first 1 MB chunk and also cause data to be read from a second 1 MB chunk, as part of executing the resultant single copy operation (312), all metadata for the first 1 MB chunk may be read and all metadata for the second 1 MB chunk may also be read. By contrast, if the copy operations are combined such that executing the resultant single copy operation (312) would cause data to be read from only a single 1 MB chunk, metadata for only the single 1 MB chunk would need to be read. As such, in order to minimize the amount of metadata that is read or written during the execution of the single copy operation (312), the metadata optimization policy may be configured such that only copy operations directed to the same underlying chunk can be combined into a single copy operation (312).

In the example method depicted in FIG. 3, combining (310) the plurality of copy operations (302) into a single copy operation (312) in dependence upon a metadata optimization policy can include identifying (320) a metadata boundary for an underlying storage resource. Such a metadata boundary can define a range of addresses within the underlying storage resource that are described by a single metadata block. The underlying storage resource may be embodied, for example, as a storage device (316, 318) in a storage array (300). In such an example, the storage array controller (304) may identify (320) a metadata boundary for an underlying storage resource by querying the underlying storage resource, by examining system configuration information that includes information describing the underlying storage resource, and so on.

In the example method depicted in FIG. 3, combining (310) the plurality of copy operations (302) into a single copy operation (312) in dependence upon a metadata optimization policy can also include grouping (322), within the single copy operation (312), all of the copy operations (302) that are directed toward the metadata boundary. The copy operations (302) that are directed toward the metadata boundary can include any copy operation that reads data from or writes data to a range of addresses within the underlying storage resource that are described by a single metadata block.

Readers will appreciate that although the steps described above results in only a single copy operation (312) being generated, the steps described above may be repeated, so that multiple copy operations may be created. For example, a first set of copy operations (302) may be received (306) and ultimately combined (310) into a first single copy operation (312) and a second set of copy operations (302) may also be received (306) and ultimately combined (310) into a second single copy operation (312). In such an example, because copy operations can be combined (310) by identifying (320) metadata boundaries and grouping (322) all of the copy operations (302) that are directed towards a single metadata boundary, the first single copy operation (312) and the second single copy operation (312) would be constructed in a way where the first single copy operation (312) and the second single copy operation (312) do not both include copy operations that are directed to the same metadata boundary.

Readers will further appreciate that although steps 320 and 322 result in only identifying (320) only a single metadata boundary and grouping (322) all of the copy operations directed toward that single metadata boundary, steps 320 and 322 may be repeated as a part of combining (310) the plurality of copy operations (302) into a single copy operation (312). For example, combining (310) the plurality of copy operations (302) into a single copy operation (312) may include identifying (320) a first metadata boundary and grouping (322) all of the copy operations directed toward the first metadata boundary into the single copy operation (312), identifying (320) a second metadata boundary and grouping (322) all of the copy operations directed toward the second metadata boundary into the single copy operation (312), identifying (320) a third metadata boundary and grouping (322) all of the copy operations directed toward the third metadata boundary into the single copy operation (312), and so on. In such a way, a particular instance of a single copy operation (312) may span many metadata boundaries but, as described above, two instances of the single copy operation (312) would not both include copy operations that are directed to the same metadata boundary.

The example method depicted in FIG. 3 also includes initiating (314) execution of the single copy operation (312). The storage array controller (304) of FIG. 3 may initiate (314) execution of the single copy operation (312), for example, by sending the single copy operation (312) to a particular storage device from which data is to be copied.

Figure 4:
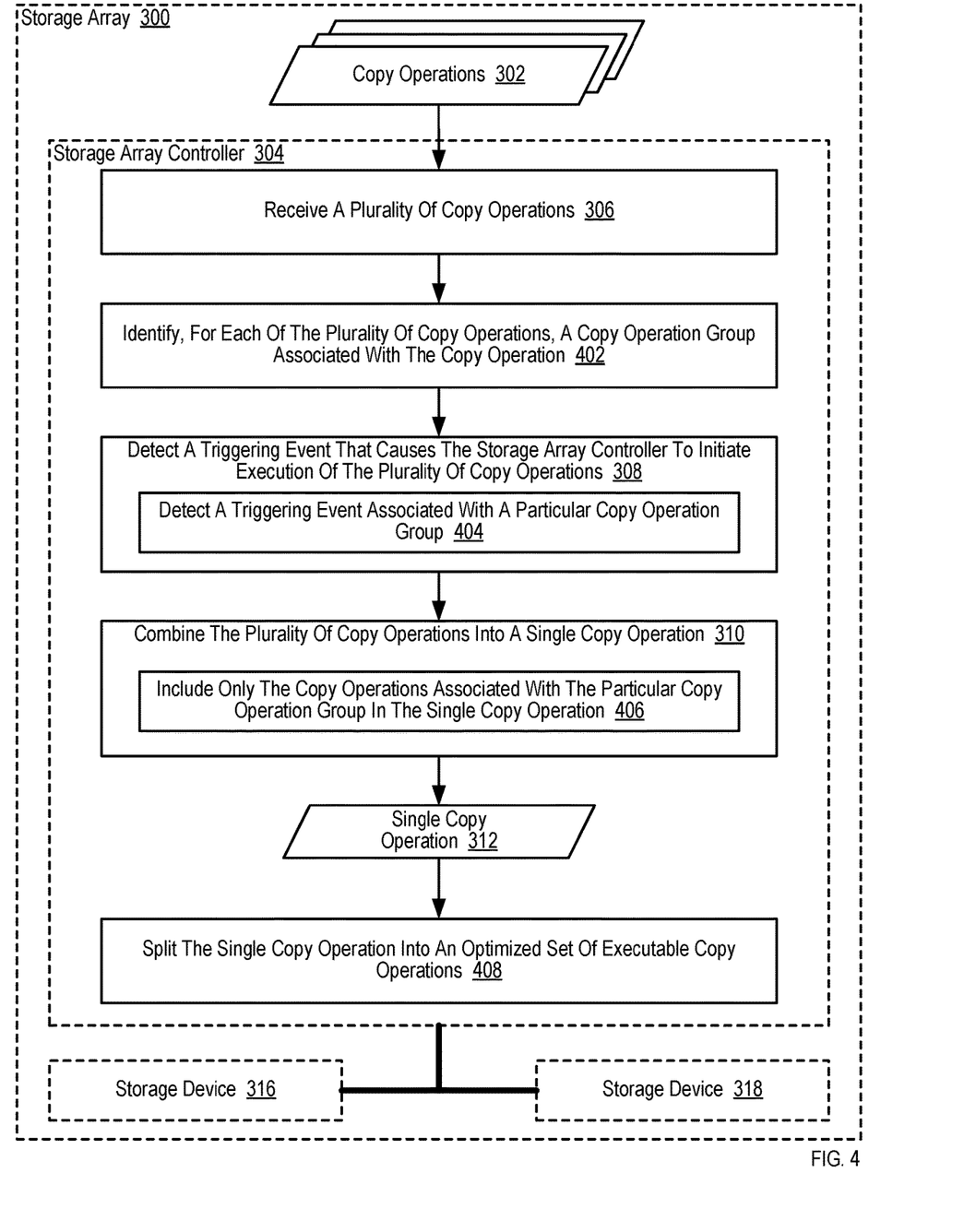
FIG. 4 sets forth a flow chart illustrating an additional example method for optimizing copy operations according to embodiments of the present disclosure.

For further explanation, FIG. 4 sets forth a flow chart illustrating an example method for optimizing copy operations according to embodiments of the present disclosure. The example method depicted in FIG. 4 is similar to the example method depicted in FIG. 3, as the example method depicted in FIG. 4 also includes receiving (306) a plurality of copy operations (302), detecting (308) a triggering event that causes the storage array controller (304) to initiate execution of the plurality of copy operations, and combining (310) the plurality of copy operations (302) into a single copy operation (312).

The example method depicted in FIG. 4 also includes identifying (402) a copy operation group associated with the copy operation. Identifying (402) a copy operation group associated with the copy operation may be carried out for each of the plurality of copy operations (302) or for only a subset of the copy operations (302). Each of the copy operation groups may represent, for example, different streams of copy operations issued by different actors (e.g., different software applications, different users, different hardware systems, and so on). Although different actors may initiate a stream of copy operations, the storage array controller (304) may be configured to only optimize copy operations from a subset of such actors. As such, each copy operation may include information that identifies the copy operation group that the copy operation belongs to, each copy operation issued by a particular actor may be associated with a particular copy operation group, or copy operations may be otherwise associated with a particular copy operation group such that the storage array controller (304) may identify (402) a copy operation group associated with the copy operation.

In the example method depicted in FIG. 4, detecting (308) the triggering event can include detecting (404) a triggering event associated with a particular copy operation group. A triggering event can represent an event whose occurrence causes the storage array controller (304) to initiate the execution of one or more of the copy operations (302) received by the storage array controller (304). Such triggering events may include, for example, the number of copy operations (302) that are associated with a particular copy operation group and that have been received (306) but not processed has reached a predetermined number, the amount of time since a copy operation (302) that is associated with a particular copy operation group has been received (306) but not processed has reached a predetermined amount of time, the amount of time since one or more of the copy operations (302) that are associated with a particular copy operation group have been received (306) but not processed has reached a predetermined amount of time, the storage array controller (304) receiving a request to write data to a storage location that is identified in one or more of the copy operations (302) as being an area of storage that is to be copied, and so on.

In the example method depicted in FIG. 4, combining (310) the plurality of copy operations (302) into a single copy operation (312) can be carried out by including (406) only the copy operations associated with the particular copy operation group in the single copy operation (312). Including (406) only the copy operations associated with the particular copy operation group in the single copy operation (312) may be carried out, for example, by creating a new copy operation having parameters that capture all storage locations that were identified for copying in the plurality of copy operations (302) that are associated with the particular copy operation group.

The example method depicted in FIG. 4 also includes splitting (408) the single copy operation (312) into an optimized set of executable copy operations. An optimal copy operation may be embodied, for example, as a copy operation that copies a particular amount of data (e.g., a block of data) that aligns with the physical or logical layout of memory on the storage device that data is copied from, as a copy operation that writes a particular amount of data (e.g., a block of data) that aligns with the physical or logical layout of memory on the storage device that data is written to, as an amount of data optimized for transmission across a network, and so on. As such, the single copy operation (312) may be split (408) into an optimized set of executable copy operations by splitting the single copy operation (312) into a set of optimal copy operations.

Figure 5:
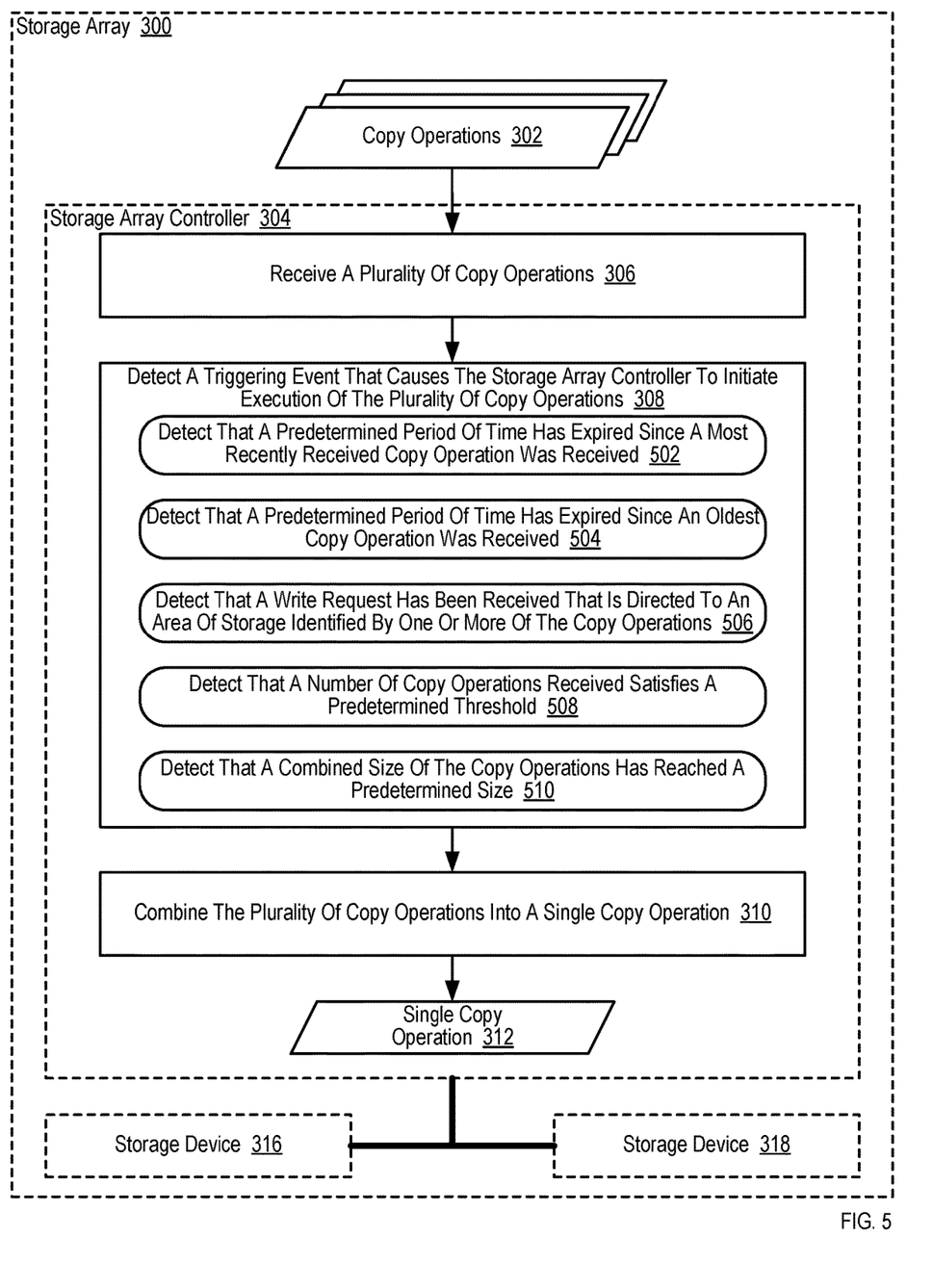
FIG. 5 sets forth a flow chart illustrating an additional example method for optimizing copy operations according to embodiments of the present disclosure.

For further explanation, FIG. 5 sets forth a flow chart illustrating an example method for optimizing copy operations according to embodiments of the present disclosure. The example method depicted in FIG. 5 is similar to the example method depicted in FIG. 3, as the example method depicted in FIG. 5 also includes receiving (306) a plurality of copy operations (302), detecting (308) a triggering event that causes the storage array controller (304) to initiate execution of the plurality of copy operations, and combining (310) the plurality of copy operations (302) into a single copy operation (312).

In the example method depicted in FIG. 5, detecting (308) a triggering event that causes the storage array controller (304) to initiate execution of the plurality of copy operations (302) can include detecting (502) that a predetermined period of time has expired since a most recently received copy operation was received. In the example method depicted in FIG. 5, when the storage array controller (304) ceases receiving copy operations (302) for a predetermined period of time, the storage array controller (304) may assume that all parts of a larger copy operation have been received. As such, the storage array controller (304) may cease optimizing the copy operations and may proceed to combine (310) the plurality of copy operations (302) into a single copy operation (312) and initiate (314) execution of the single copy operation (312).

In the example method depicted in FIG. 5, detecting (502) that a predetermined period of time has expired since a most recently received copy operation was received may be carried out, for example, through the use of a timer that resets every time a copy operation is received (306). Although the example method depicted in FIG. 5 describes the storage array controller (304) detecting (502) that a predetermined period of time has expired since a most recently received copy operation was received, readers will appreciate that the storage array controller (304) may utilize other criteria to determine that an incoming flow of copy operations has ceased. For example, rather than detecting (502) that a predetermined period of time has expired since a most recently received copy operation was received, the storage array controller (304) may track the number of read/write requests that have been received since a most recently received copy operation was received, the storage array controller (304) may track the number of copy operations associated with other copy operation groups that have been received since a most recently received copy operation associated with a particular copy operation group was received, and so on.

In the example method depicted in FIG. 5, detecting (308) a triggering event that causes the storage array controller (304) to initiate execution of the plurality of copy operations can include detecting (504) that a predetermined period of time has expired since an oldest copy operation was received. In the example method depicted in FIG. 5, the storage array controller (304) may be configured to limit the time that the storage array controller (304) can hold a particular copy operation. As such, the storage array controller (304) may cease optimizing the copy operations and may proceed to combine (310) the plurality of copy operations (302) into a single copy operation (312) and initiate (314) execution of the single copy operation (312) upon detecting (504) that the predetermined period of time has expired since an oldest copy operation was received.

In the example method depicted in FIG. 5, detecting (504) that the predetermined period of time has expired since an oldest copy operation was received may be carried out, for example, through the use of a timer and/or timestamps associated with each received copy operation. Although the example method depicted in FIG. 5 describes the storage array controller (304) detecting (504) that the predetermined period of time has expired since an oldest copy operation was received, readers will appreciate that the storage array controller (304) may utilize other criteria to determine that a pending copy operation should move forward with processing. For example, rather than detecting (504) that the predetermined period of time has expired since an oldest copy operation was received, the storage array controller (304) may track the number of read/write requests that have been received since an oldest copy operation was received, the storage array controller (304) may track the number of copy operations associated with other copy operation groups that have been received since an oldest copy operation associated with a particular copy operation group was received, and so on.

In the example method depicted in FIG. 5, detecting (308) a triggering event that causes the storage array controller (304) to initiate execution of the plurality of copy operations can include detecting (506) that a write request has been received that is directed to an area of storage identified by one or more of the copy operations. As described above, a particular copy operation can represent a request to copy data contained in one area of computer storage to another area of computer storage, where the areas need not be contiguous memory regions. In such an example, when a write request has been received that is directed to an area of storage identified by one or more of the copy operations, the copy operation should be performed before executing the write operation, to ensure that the data that is copied and written as part of the copy operation is the same data that was requested to be copied and written when the copy operation was issued. As such, once the storage array controller (304) detects (506) that a write request has been received that is directed to an area of storage identified by one or more of the copy operations, the storage array controller (304) may cease optimizing the copy operations and may proceed to combine (310) the plurality of copy operations (302) into a single copy operation (312) and initiate (314) execution of the single copy operation (312), thus reducing delay in servicing the write request. Readers will appreciate that read requests may be processed immediately, however, as a read request will not impact the data that is copied and written as part of the copy operation.

In the example method depicted in FIG. 5, detecting (308) a triggering event that causes the storage array controller (304) to initiate execution of the plurality of copy operations can include detecting (508) that a number of copy operations received has reached a predetermined number. The storage array controller (504) depicted in FIG. 5 may be configured to only optimize a predetermined number of copy operations before combining (310) the plurality of copy operations (302) into a single copy operation (312) and initiating (314) execution of the single copy operation (312). As such, the storage array controller (304) may be configured to detect (508) that a number of copy operations received has reached a predetermined number through the use of one or more counters that is incremented, decremented, or otherwise altered as each copy operation is received.

In the example method depicted in FIG. 5, detecting (308) a triggering event that causes the storage array controller (304) to initiate execution of the plurality of copy operations can alternatively include detecting (510) that a combined size of the copy operations has reached a predetermined size. The predetermined size may be selected, for example, based on the physical or logical layout of memory on the storage devices, based on network bandwidth constraints, based upon constraints associated with the storage array controller (304), based on desired performance characteristics, and so on. Detecting (510) that a combined size of the copy operations has reached a predetermined size may be carried out, for example, by determining the size of each copy operation that has been received and keeping a running sum of the collective size of copy operations that have been received.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   detecting a triggering event that causes a storage array controller to initiate execution of a plurality of copy operations;
   combining, in dependence upon a metadata optimization policy, the plurality of copy operations into a single copy operation; and
   splitting the single copy operation into an optimized set of executable copy operations that copy a particular amount of data that aligns with the physical or logical layout of memory on the storage device that data is copied from.

2. The method of claim 1 wherein combining, in dependence upon a metadata optimization policy, the plurality of copy operations into a single copy operation further comprises:

identifying a metadata boundary for an underlying storage resource, the metadata boundary defining a range of addresses within the underlying storage resources that are described by a single metadata block; and grouping, within the single copy operation, all of the copy operations that are directed toward the metadata boundary.

3. The method of claim 1 further comprising:

identifying a copy operation group associated with the copy operation, wherein:

detecting the triggering event further comprises detecting a triggering event associated with a particular copy operation group; and combining the plurality of copy operations into the single copy operation further comprises including only the copy operations associated with the particular copy operation group in the single copy operation.

4. The method of claim 1 wherein splitting the single copy operation into an optimized set of executable copy operations further comprises splitting the single copy operation into one or more copy operations that write a particular amount of data that aligns with the physical or logical layout of memory on the storage device that data is written to.

5. The method of claim 1 wherein splitting the single copy operation into an optimized set of executable copy operations further comprises splitting the single copy operation into one or more copy operations that write an amount of data optimized for transmission across a network.

6. The method of claim 1 wherein the single copy operation and the executable copy operations are virtual copy operations.

7. The method of claim 1 wherein detecting the triggering event further comprises detecting that a number of copy operations received has reached a predetermined number.

8. The method of claim 1 wherein detecting the triggering event further comprises detecting that a combined size of the copy operations has reached a predetermined size threshold.

9. A storage array controller, the storage array controller including a computer processor and a computer memory, the computer memory including computer program instructions that, when executed, cause the storage array controller to carry out the steps of:

detecting a triggering event that causes a storage array controller to initiate execution of a plurality of copy operations;

combining, in dependence upon a metadata optimization policy, the plurality of copy operations into a single copy operation; and splitting the single copy operation into an optimized set of executable copy operations that copy a particular amount of data that aligns with the physical or logical layout of memory on the storage device that data is copied from.

10. The storage array controller of claim 9 wherein combining, in dependence upon a metadata optimization policy, the plurality of copy operations into a single copy operation further comprises:

identifying a metadata boundary for an underlying storage resource, the metadata boundary defining a range of addresses within the underlying storage resources that are described by a single metadata block; and grouping, within the single copy operation, all of the copy operations that are directed toward the metadata boundary.

11. The storage array controller of claim 9 wherein splitting the single copy operation into an optimized set of executable copy operations further comprises splitting the single copy operation into one or more copy operations that copy a particular amount of data that aligns with the physical or logical layout of memory on the storage device that data is copied from.

12. The storage array controller of claim 9 further comprising computer program instructions that, when executed, cause the storage array controller to carry out the steps of:

identifying a copy operation group associated with the copy operation, wherein:

detecting the triggering event further comprises detecting a triggering event associated with a particular copy operation group; and combining the plurality of copy operations into the single copy operation further comprises including only the copy operations associated with the particular copy operation group in the single copy operation.

13. The storage array controller of claim 9 wherein detecting the triggering event further comprises detecting that a predetermined period of time has expired since a most recently received copy operation was received.

14. The storage array controller of claim 9 wherein detecting the triggering event further comprises detecting that a predetermined period of time has expired since an oldest copy operation was received.

15. The storage array controller of claim 9 wherein splitting the single copy operation into an optimized set of executable copy operations further comprises splitting the single copy operation into one or more copy operations that write a particular amount of data that aligns with the physical or logical layout of memory on the storage device that data is written to.

16. The storage array controller of claim 9 wherein splitting the single copy operation into an optimized set of executable copy operations further comprises splitting the single copy operation into one or more copy operations that write an amount of data optimized for transmission across a network.

17. The storage array controller of claim 9 wherein the single copy operation and the executable copy operations are virtual copy operations.

18. A computer program product, the computer program product disposed on a computer readable storage medium, the computer program product comprising computer program instructions that, when executed, cause a storage device to carry out the steps of:

detecting a triggering event that causes a storage array controller to initiate execution of a plurality of copy operations;

combining, in dependence upon a metadata optimization policy, the plurality of copy operations into a single copy operation; and splitting the single copy operation into an optimized set of executable copy operations that copy a particular amount of data that aligns with the physical or logical layout of memory on the storage device that data is copied from.

19. The computer program product of claim 18 wherein combining, in dependence upon a metadata optimization policy, the plurality of copy operations into a single copy operation further comprises:

identifying a metadata boundary for an underlying storage resource, the metadata boundary defining a range of addresses within the underlying storage resources that are described by a single metadata block; and grouping, within the single copy operation, all of the copy operations that are directed toward the metadata boundary.

* * * * *